No. 706,828. Patented Aug. 12, 1902.
D. W. JEWELL.
AUTOMATIC AIR BRAKE ORDER SYSTEM.
(Application filed Mar. 26, 1902.)

(No Model.) 4 Sheets—Sheet 1.

No. 706,828. Patented Aug. 12, 1902.
D. W. JEWELL.
AUTOMATIC AIR BRAKE ORDER SYSTEM.
(Application filed Mar. 26, 1902.)

(No Model.) 4 Sheets—Sheet 2.

Witnesses
D. W. Jewell, Inventor.
by C. A. Snow & Co.
Attorneys

No. 706,828. Patented Aug. 12, 1902.
D. W. JEWELL.
AUTOMATIC AIR BRAKE ORDER SYSTEM.
(Application filed Mar. 26, 1902.)
(No Model.) 4 Sheets—Sheet 3.
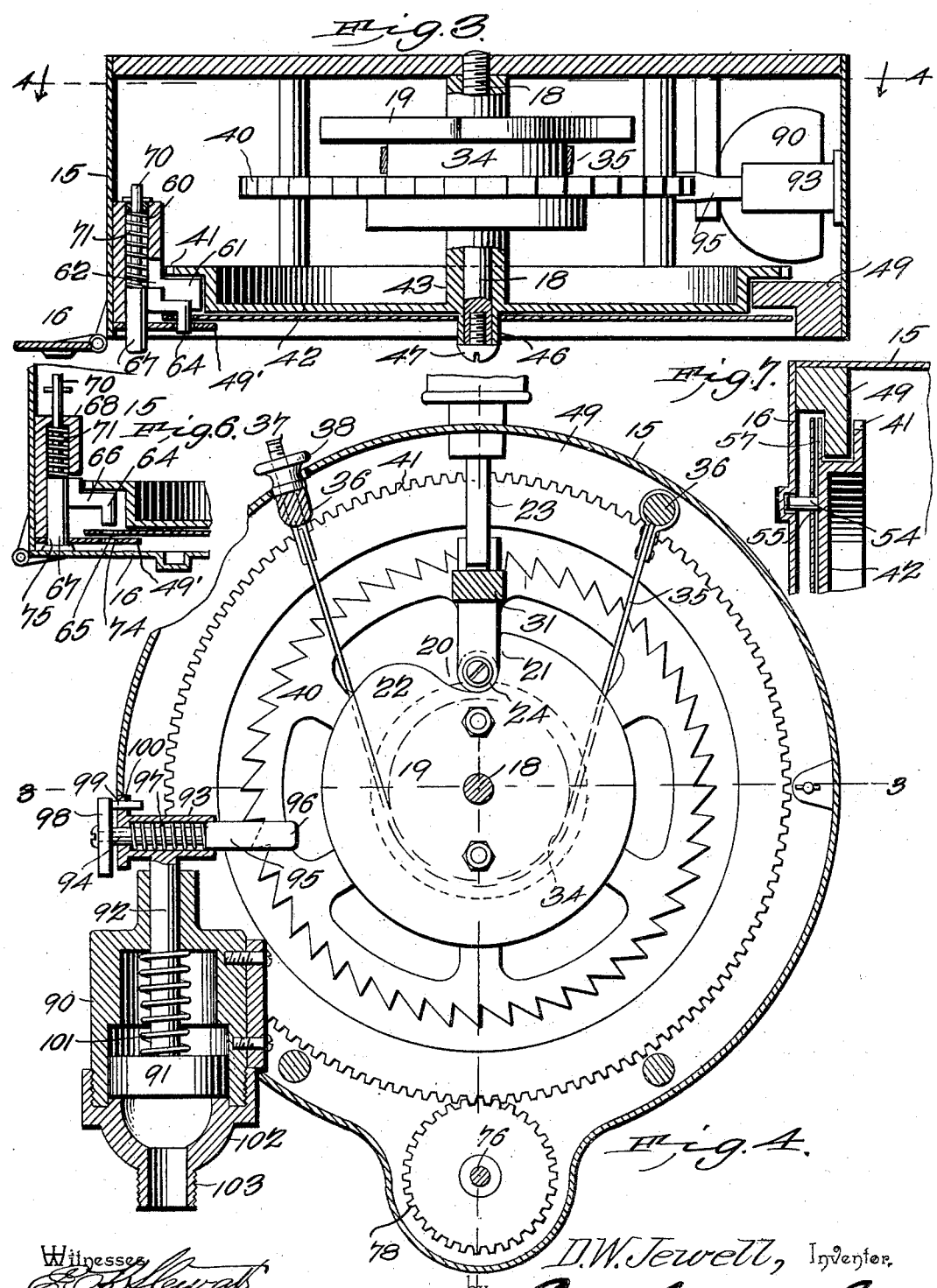
Witnesses
D. W. Jewell, Inventor.
Attorneys No. 706,828. Patented Aug. 12, 1902.
D. W. JEWELL.
AUTOMATIC AIR BRAKE ORDER SYSTEM.
(Application filed Mar. 26, 1902.)
(No Model.) 4 Sheets—Sheet 4.

D. W. Jewell, Inventor.

UNITED STATES PATENT OFFICE.

DANFORD W. JEWELL, OF KALAMAZOO, MICHIGAN, ASSIGNOR OF TWO-THIRDS TO WILLIS H. RALSTON AND MELVIN O. BASSITT, OF KALAMAZOO, MICHIGAN.

AUTOMATIC AIR-BRAKE ORDER SYSTEM.

SPECIFICATION forming part of Letters Patent No. 706,828, dated August 12, 1902.

Application filed March 26, 1902. Serial No. 100,127. (No model.)

*To all whom it may concern:*

Be it known that I, DANFORD W. JEWELL, a citizen of the United States, residing at Kalamazoo, in the county of Kalamazoo and State of Michigan, have invented a new and useful Automatic Air-Brake Order System, of which the following is a specification.

This invention relates to certain improvements in signaling and controlling devices for locomotive-engines, and has for its principal object to provide a mechanism which when adjusted before starting on a run will sound an alarm and apply the brakes at any predetermined point along the line.

A further object of the invention is to so arrange the signaling and controlling mechanism that it will be impossible for the engineer to effect any adjustment except that called for in the order given him by the train-despatcher or operator, and thus enable the latter to insure the stopping of the train at any given point.

A still further object of the invention is to prevent the loss or destruction of train-orders under any ordinary circumstances and to prevent any misunderstanding of orders on the part of the engineer by placing the engine under the control of the operator issuing the order.

A still further object of the invention is to simplify the construction of mechanism of the class of which the invention relates, to insure the positive operation of the same, and to enable the device to be readily adjusted in accordance with the terms of the train-order.

With these and other objects in view the invention consists in the novel construction and combination of parts hereinafter described, illustrated in the accompanying drawings, and particularly pointed out in the appended claims.

Figure 1:
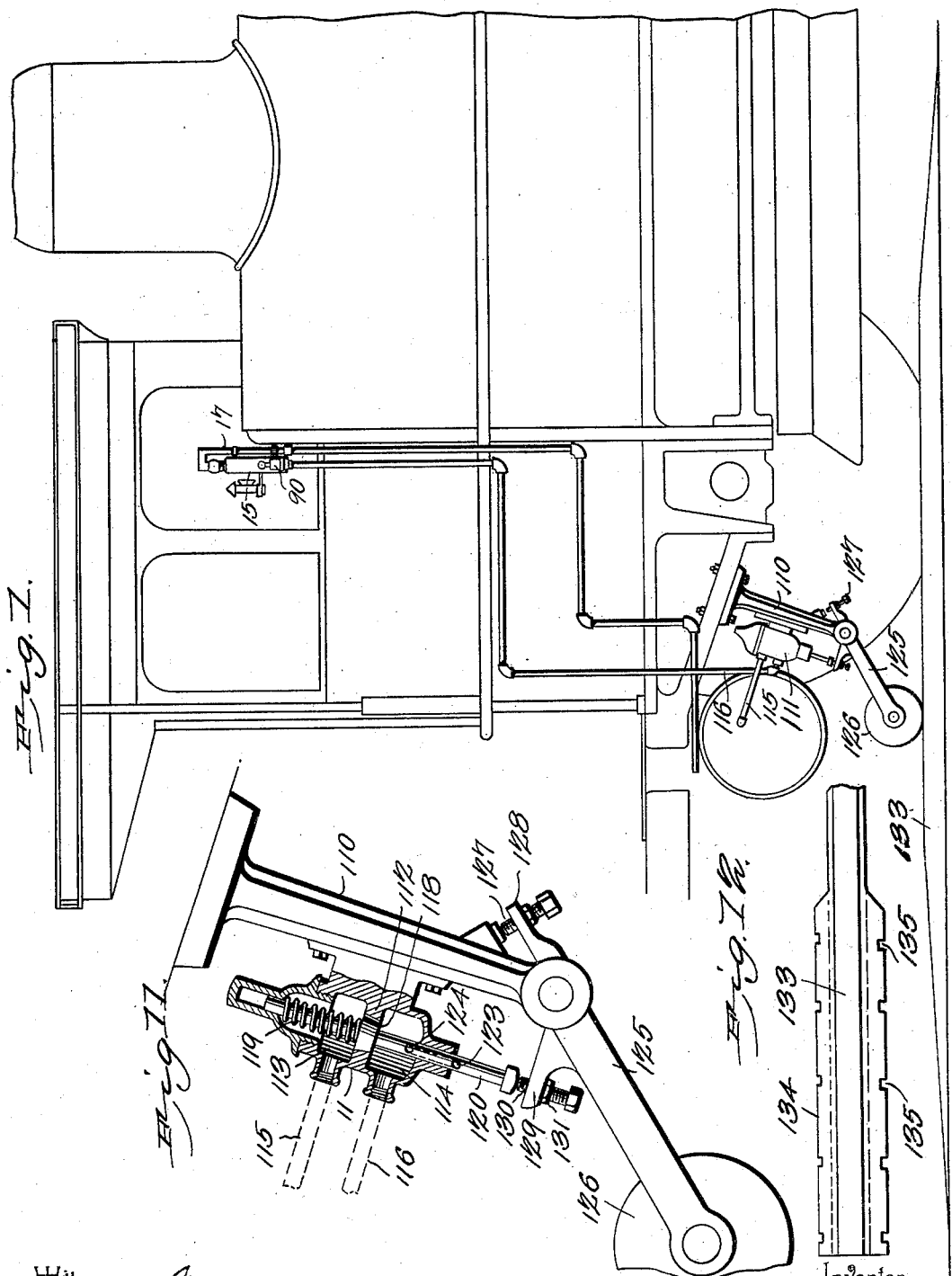
Figure 2:
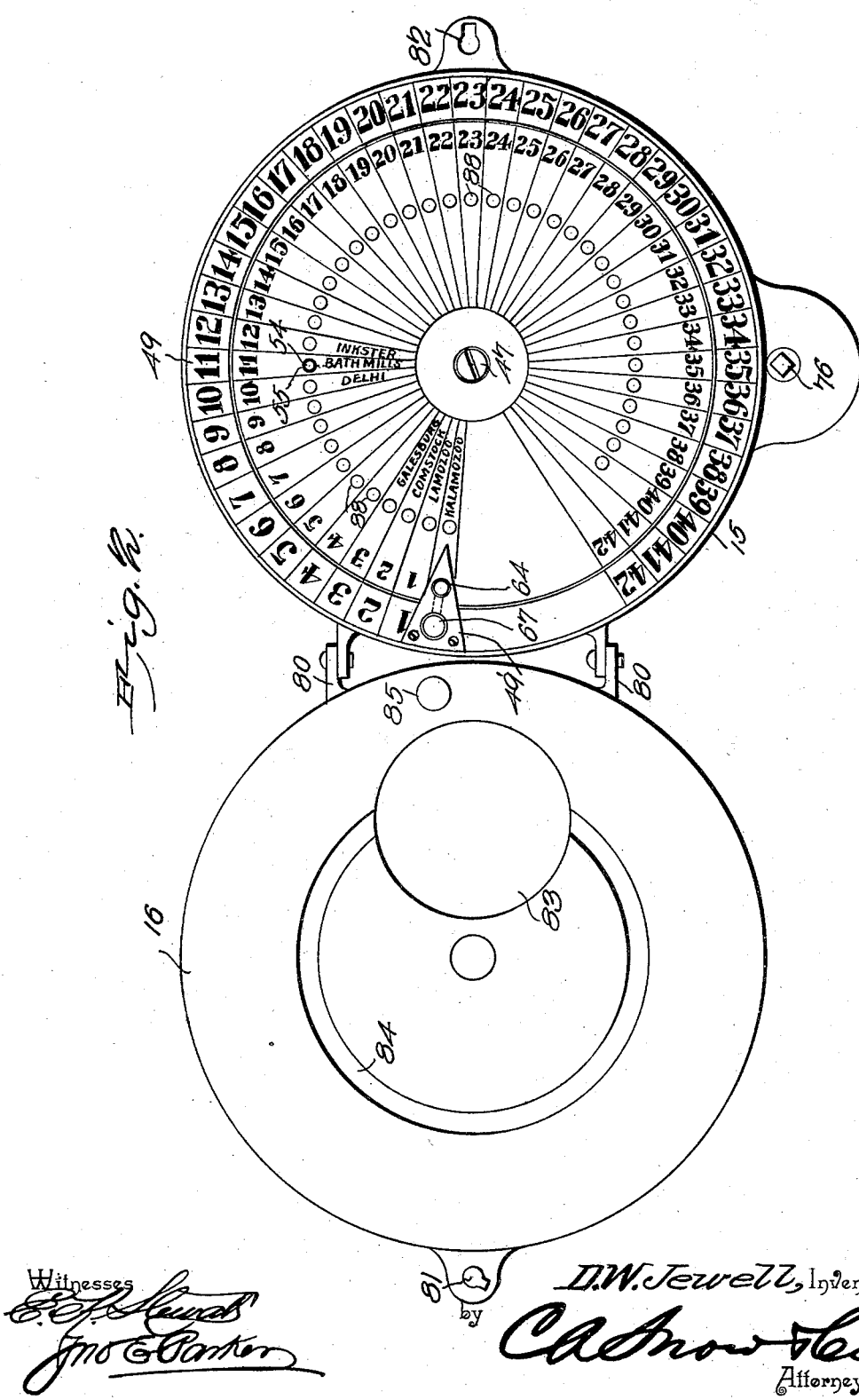
Figure 5:
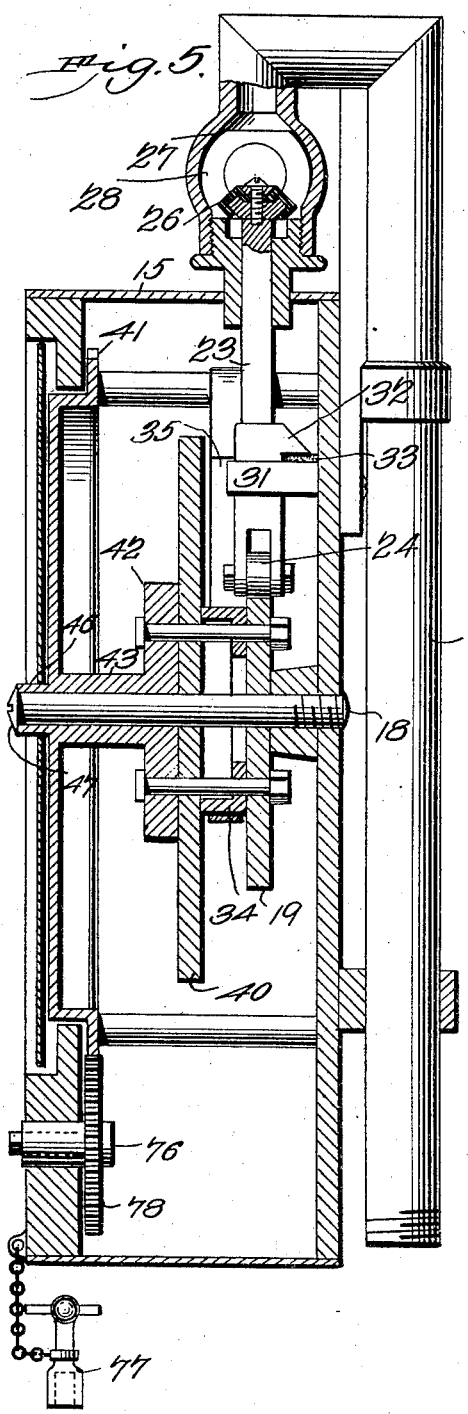
Figure 8:
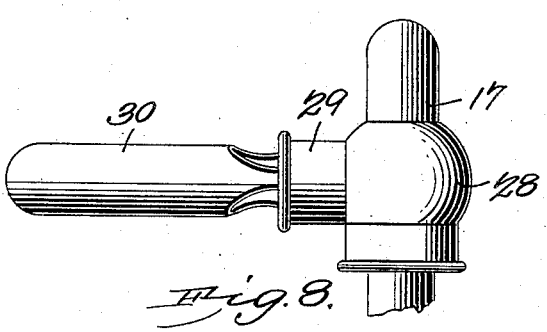
Figure 9:
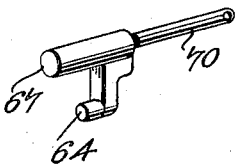
Figure 10:
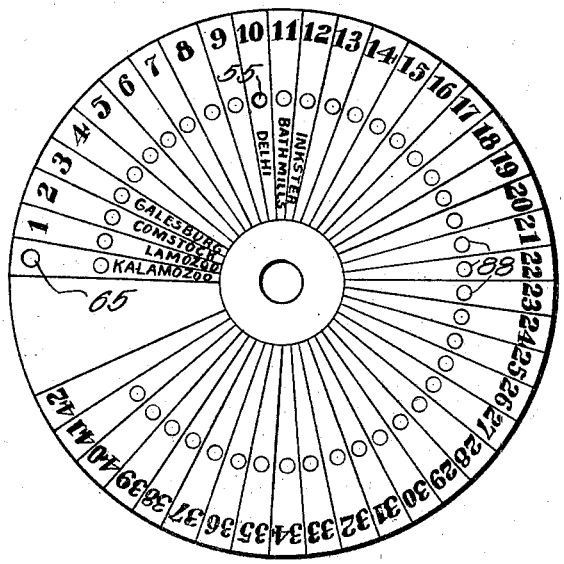

In the drawings, Figure 1 is an elevation of a portion of a locomotive-engine, illustrating the application thereto of a train signaling and controlling device constructed in accordance with my invention. Fig. 2 is an elevation of the mechanism contained within the cab of the engine. The door of the casing of such mechanism is opened to illustrate the arrangement of the dial. Fig. 3 is a sectional plan view of a portion of the mechanism on the line 3 3 of Fig. 4. Fig. 4 is a sectional elevation of the same on the line 4 4 of Fig. 3. Fig. 5 is a longitudinal sectional elevation of the device on the line 5 5 of Fig. 4. Figs. 6 and 7 are detail sectional views of a portion of the mechanism. Fig. 8 is an elevation of the whistle or other alarm employed in connection with the device. Fig. 9 is a perspective view of one of the train-order-locking pins. Fig. 10 is a face view of a form of train-order which it is preferred to employ. Fig. 11 is a detail sectional view, on an enlarged scale, of the mechanism carried by the locomotive-frame. Fig. 12 is a detail plan view of a portion of an operating-rail placed at intervals along the road-bed for operating the train signaling and controlling devices.

Similar numerals of reference are employed to indicate corresponding parts throughout the several figures of the drawings.

The mechanism is one of that general class in which a step-by-step movement is imparted to an indicator in the train or engine by contact with stationary rails or tappets located at or near each station, switch, crossing, or other point throughout the length of the line.

In the engine-cab is placed a casing 15, having a suitable hinged cover 16 and supported on a vertically-disposed pipe 17, which is connected to the train-pipe of a Westinghouse or other air-brake system of that class in which the reduction of pressure in the train-pipe permits the application of the brakes under the pressure of air in auxiliary reservoirs carried by each car in the train.

In the base or rear plate of the casing is secured a spindle or stud 18, forming a bearing for the support of a disk cam 19, having a peripherally-disposed notch or recess 20, one wall of which is abrupt, as indicated at 21, and the other gradually curved or rounded, as indicated at 22 in Fig. 4. The cam supports a vertically-guided valve-rod 23, having at its lower end a suitable antifriction-roller 24 for contact with the surface of the cam. At the top of the valve-stem is a valve 26, adapted to a valve-seat 27 in a valve-chamber 28, which communicates with the branch 17 of the train-pipe. From the side of the valve-chamber leads a nipple 29, to which is connected a suitable whistle 30, having the usual openings for the escape of air. Normally the valve 26 is held tightly to its seat by the cam 19, and escape of air from the train-pipe is prevented. When the train has arrived at a predetermined point, the anti-friction-roller descends into the notch or recess 20 of the cam, opens the valve, and permits the escape of air from the train-pipe, sounding the whistle or other alarm and permitting the application of the brake. In order to prevent breakage of the parts during the movement of the valve under the pressure of air in the train-pipe, the valve-stem is guided in a slotted block 31 and is provided with a projecting boss 32, on the under side of which is a cushion 33, of rubber or other yielding material, which makes contact with the top of the block and takes up the shock of the impact.

To one side of the cam 19 is secured a friction-wheel 34, around which passes a friction-band 35, having one end disposed around a stud 36, projecting from the base-plate, the opposite end of said band being provided with a screw-thread 37, passing through any suitable opening formed in a second stud and adapted for the reception of an adjusting-nut 38, by which the frictional contact between the band and wheel may be regulated. The spindle 18 forms also a journal or bearing for the support of a ratchet-wheel 40 and a gear-wheel 41, the latter being provided with a disk face 42, to which the train-orders are attached in the manner hereinafter described. The gear-wheel 41 has a central hub 43 and an integral annular flange or collar 44, through which and through the ratchet-wheel and cam are passed suitable securing-bolts, which rigidly lock all of the parts together. From the disk face 42 projects an annular flange 46, against the outer edge of which fits a securing-screw 47, extending into a threaded opening in the end of the spindle 18 and serving to hold the various rotating members in proper position on the spindle.

In addition to the upper studs 36, to which the brake-band is secured, the lower portion of the base-plate is provided with a number of similar studs, and to all these studs is secured a ring dial 49, the face of which is flush with the dial-face 42 of the gear-wheel 41, or, by preference, is arranged slightly below the face of the dial 42 for a portion of its width, forming an annular depression for the reception of a pointer or arrow 49', carried by and projecting beyond the periphery of the dial 42. The outer portion of the dial 49 is divided into a number of equal spaces, the number of spaces being equal to the number of teeth on the ratchet-wheel 40 and equal to or greater than the number of stations, switches, or order-points between any two main-line stations on the road, and in each of these spaces is a designating-mark—as, for instance, the numerals "1," "2," "3," &c.—to represent the names or numbers by which said stations or other points are known or to designate the consecutive order in which they are situated along the line. The pointer or arrow 49' has a fixed position in alinement with the notch or recess of the cam when the device is intended for operation with the arrow in vertical position; but preferably for convenience in reading the names of the stations as they appear on the train-order the arrow or pointer will be arranged at an angle of ninety degrees in advance of the notch or recess of the cam, as indicated in Fig. 2. Projecting from the face of the dial 42 is a pin or stud 54, which is located in the radial line of the arrow or pointer and fits within an opening 55, punched in the disk-like train-order at a point opposite the name of the station or siding at which the engineer has orders to stop.

At a point slightly above the face of both dials 42 and 49 is secured a V-shaped pointer 57, which represents the zero-mark of the indicator, and when the train-order is placed in position it is so adjusted that the pointer 57 will be in direct alinement with the name of the station issuing the order.

At one side of the dial 49 are arranged two openings 60 61, united by a connecting-slot 62, and in the space thus formed is arranged a train-order lock comprising a pin 64, adapted to enter an opening 65, punched in the train-order at a point opposite the name of the issuing-station. This pin is connected by a web 66 to a stud 67, which is guided within the opening 60. The shank of the stud 67 is reduced in diameter and extends through a contracted opening formed in the rear end of a lug 68 on the dial 49, a pin 70 being passed through the outer portion of the shank to limit the extent of outward movement of the stud. The shank of the stud is surrounded by a coiled compression-spring 71 in the lug 68, said spring tending normally to project the stud and hold both the stud and the pin 64 in the position shown in Fig. 3. In the V-shaped pointer 49' are formed two openings 74 and 75, located, respectively, in alinement with the openings 60 and 61, and an auxiliary opening or slot may be formed for the passage of a portion of the connecting-web 66.

In the lower portion of the casing is arranged a shaft 76, having a squared or rectangular end portion projecting out through an opening in the face of the casing for the reception of a suitable winding-key 77, and on said shaft is secured a pinion 78, intermeshing with the gear-wheel 41, the arrangement being such that by turning the key the gear-wheel, the dial 42, the ratchet-wheel, and cam will be rotated through any desired angular distance to adjust the arrow or pointer on the dial 42 to a position opposite the number of the station or siding where the train is to stop.

The door or cover 16 is of a diameter equal to that of the casing and comprises a flanged metallic disk fulcrumed on lugs 80 and provided with a locking-key 81, adapted to a suitable slotted opening 82 in a lug carried by the casing, so that the door may be locked in closed position. The major portion of the door is formed of metal; but at one side, in alinement with the pointer 49', said door is provided with a disk 83, of glass or similar material, through which the names on the train-order may be observed. The door is provided with an annular groove 84 for the reception of a stud 54 and permits free rotation of the stud, the dial, and the train-order. The door is further provided with a projecting boss 85, adapted to engage with the end of the stud 67 when the door is closed, forcing the stud inwardly to an extent sufficient to permit the withdrawal of the pin 64 to a point below the surface of the dial 49.

Each train-order is in the form of a dial or disk of cardboard or heavy paper divided radially into a number of spaces equal to the number of spaces on the dial 49 and bearing near its edge numerals corresponding to those on said dial 49. At some little distance from the edge of the train-order a punch-mark is printed in each space, as indicated at 88, and between this and the center of the disk appear the names of the various stations, sidings, and other points between two main stations—as, for instance, the names of stations and sidings on the railroad division between Kalamazoo and Detroit.

If the operator at Kalamazoo wishes to issue an order to an engineer to meet another train at, say, "Bath Mills," eleven stations east of Kalamazoo, he punches the disk at the outer row of numerals opposite "Kalamazoo" and punches also on the small circle opposite "Bath Mills" and issues the order to the engineer. On receipt of the order the engineer turns the key 77, and through it the dial 42, the ratchet-wheel, and cam, until the arrow or pointer of the dial 42 is directly opposite the number "11" on the dial 49, this corresponding to the number of the station at which he is to stop. The central opening of the order-disk is then fitted over the annular flange 46 of dial 42, and the two openings punched in the order-disk are fitted over the pins or studs 54 and 64, the edge of the order-disk being placed under the V-shaped pointer 57 for this purpose. The position of the openings in the order-disk makes it impossible to adjust the disk improperly and compels the engineer to move the disk 42 to correct position before the order-disk can be inserted in place. The door is then closed and locked, the boss 85 coming into contact with the stud 67 and forcing the pin 64 out of engagement with the order-disk, the latter being then held between the inner face of the door and the dial and being properly supported by the annular flange 46 and the stud 54 of the dial 42.

As the engine travels suitable mechanism is employed to impart a step-by-step movement to the ratchet-wheel 40, and at the eleventh impulse, which will be imparted to such ratchet-wheel a short distance before the engine reaches Bath Mills, the pointer 57 of the disk 42 will be in direct alinement with the pointer 49' of the stationary disk 49, and the cam will have been moved to such position as to permit of the descent of the valve-rod 23, opening valve 26 and permitting the escape of air from the train-pipe, the whistle or other alarm being sounded and the air-brakes applied to stop the train.

At one side of the casing 15 is secured a small cylinder 90, adapted for the reception of a piston or plunger 91, carried by a rod 92, which extends out through the upper head of the cylinder and is provided with a guiding-box 93 for the reception of the stem 94 of a pawl 95. The pawl 95 has two arms 96, which fit on either side of the ratchet-wheel 40 and serve as guides to prevent the disengagement of the pawl and the teeth of the ratchet-wheel, the central portion or body of the pawl engaging said teeth and imparting movement to the ratchet-wheel to the extent of a single tooth at each upward movement of the piston 91. The stem 94 of the pawl is surrounded by a spring 97, which permits a yielding movement of the pawl during the downward movement of the piston, and to permit the disengagement of the pawls from the ratchet-wheel, if it become necessary at any time to reverse the movement of said ratchet-wheel, I place at the end of the stem a milled disk 98, having a pin 99, adapted to engage in a suitable opening in a lug or boss 100, carried by the pawl-guiding box. To disengage the pawl, the disk is pulled outwardly until the pin 99 is disengaged from the opening, after which the disk may be slightly rotated in either direction to permit the end of the pin to engage the outer surface of the lug and hold the pawl in disengaged position as long as may be necessary. This mechanism may also be employed to throw the device out of operation should the engineer wish to check the speed of the train in advance of the automatic application of the brakes or should he desire to proceed without stopping.

The piston 91 fits within an enlarged portion of the cylinder and is moved downwardly by a suitable compression-spring 101 after each upward impulse, and on the bottom of the cylinder is a semispherical head 102, having a nipple 103 for connection to a supply of air or other fluid under pressure, communication between the air-supply and the cylinder being established as the train approaches each stopping, siding, or other desired point along the line.

To the lower rear portion of the train of the engine is secured a hanger 110, carrying a valve-casing 111, provided by a partition 112 into two chambers 113 114, the chamber 113 communicating by a pipe 115 with an air-reservoir 116, which may form a part of the air-brake system, and the chamber 114 being in communication through a pipe 116 with the small cylinder 90. In the partition is formed a valve-seat for the reception of a valve 118, normally held in closed position by the pressure of air from the reservoir and by a coiled compression-spring 119, which surrounds the valve-stem 120, one end of the spring bearing against the valve and the opposite end against the end wall of the valve-casing. The opposite end of the valve-stem extends out through a guiding opening formed in the valve-casing, and in said stem are formed two openings 122 and 123, arranged, respectively, at points inside and outside the valve-casing when the valve is in the normal or closed position. These openings are connected by a longitudinally-disposed port or passage 124 and permit the gradual leakage of air from the pipe 116 after the valve 118 has closed, it being understood that on each opening movement of the valve air is admitted from the reservoir to the cylinder 90 through the pipes 115 and 116 and the valve-chamber, the air-pressure forcing the piston upwardly and effecting an operative movement of the pawl to the extent of a single tooth of the ratchet-wheel. When the valve is open, the opening or port 123 is disposed within the guiding opening of the valve-casing, and the escape of air is prevented, these openings serving only to act after the valve has reached its fully-closed position.

To the lower end of the hanger 110 is pivoted an arm 125, carrying at its lower end a wheel or disk 126, excessive downward movement of said arm and wheel being prevented by an adjustable screw 127 passing through a forwardly-projecting lug 128 on the arm 125 and engaging the lower forward face of the hanger. On the upper side of the arm 125 is a lug or block 129, adapted for the reception of a set-screw 130, having a suitable locknut 131, by which it may be locked in an adjusted position. The end of the set-screw is adapted for contact with an enlarged head on the end of the valve-stem 120, and at each upward movement of the wheel 126, due to contact with a projection or rail at or near each station, the valve will be opened and the ratchet-wheel operated.

In order to effect the operation of the wheel 126 with as little shock and jar as possible, I employ at or near each station a rail 133, formed of a channel-bar, the opposite ends of which are tapered downwardly and the side webs spread laterally to form horizontal flanges provided with notches or openings 135 for the passage of securing-spikes. The rails are secured to the supporting-ties at a point inside the right-hand traffic-rail and, owing to the inclined surface presented to the wheel, effect a gradual upward movement of such wheel and allow the wheel to gradually descend, and thus prevent injury to the automatic valve.

In using the device the perforations made in the train-order disk absolutely prevent any wrong adjustment of the mechanism and permit the control of the train by the person giving the order to the engineer. The perforations also are of such character as to prevent any mistake in the reading of an order, inasmuch as the perforation must be made directly opposite the printed name of the station where the order is to be directed to, and the engineer must, as a matter of course, understand the order before he can adjust the mechanism for its reception.

The device as described may be employed merely to give a warning-signal to the engineer as the station at which he is to stop is approached, or it may be used as a station-indicator to point out the different stations along the line, and an indicator may be placed in each car of the train in convenient position for the passengers.

The device may further be employed to cut off the supply of steam to the cylinders of the locomotive in advance of or simultaneously with the operation of the brakes, and when used to apply the brakes only the reduction in pressure of the train-pipe will generally be about equal to that which occurs in an ordinary service application and not the sudden reduction in pressure which accompanies the emergency stop.

While the construction herein described and illustrated in the accompanying drawings is the preferred form of the device it is obvious that various changes in the form, proportions, size, and minor details of the structure may be made without departing from the spirit or sacrificing any of the advantages of my invention.

Having thus described my invention, what I claim is—

1. The combination with means carried by the train for signaling at a predetermined period, of an operative mechanism having as one of its elements a removable member, the conformation of which compels the adjustment of said mechanism to a predetermined position.

2. A train-signaling mechanism comprising a train-order card, an adjustable mechanism arranged on the train for the reception and support of said card, the adjustment of such mechanism and the time of operation of the signaling mechanism being governed by the conformation of the card.

3. In a device of the class specified, a mechanism having as one of its elements a revoluble member, means for imparting motion thereto, means for effecting a preliminary adjustment of said revoluble member, and a train-order adapted to be carried by said revoluble member and governing the extent of adjustment of said revoluble member.

4. In a device of the class specified, a mechanism having as one of its elements a revoluble member, means for imparting motion thereto, means for effecting a preliminary adjustment of said revoluble member, and a train-order the conformation of which governs the adjustment of said revoluble member.

5. In a device of the class specified, a mechanism having as elements a fixed member and an adjustable revoluble member, each member bearing distinguishing-marks and the distance between such marks controlling the time or place of actuation, and a train-order the conformation of which governs the adjustment of the revoluble member and the distance between such distinguishing-marks.

6. In a device of the class specified, a mechanism having a stationary member, a revoluble dial, means for actuating the dial, means for adjusting the dial, and a train-order the conformation of which governs the extent of adjustment of such dial.

7. In a device of the class specified, a mechanism having a fixed member, a revoluble dial, means for adjusting the dial, a pin or stud carried by such dial, and a train-order having a perforation for the reception of the pin.

8. In a device of the class specified, a train-order, a revoluble dial for its reception and support, a train-order-engaging means carried by the dial, and means for adjusting the position of such train-order-engaging means in accordance with the conformation of the train-order.

9. In a device of the class specified, a stationary member, a movable member, a train-order, a train-order-engaging means carried by each member, and mechanism for adjusting the movable member, the degree of adjustment being governed by the conformation of the train-order.

10. In a device of the class specified, stationary and movable members each having a projecting stud, means for adjusting the movable member, and a train-order having perforations for the reception of the two studs, the distance between such perforations determining and governing the extent of adjustment of the movable member.

11. In a device of the class specified, a stationary ring, a revoluble dial, studs carried by the ring and dial, means for effecting a preliminary adjustment of the dial, a removable member having perforations for the reception of both studs and governing the extent of adjustment, and means for disengaging the stud carried by the stationary ring.

12. In a device of the class specified, a stationary ring, a revoluble dial, means for adjusting the dial, studs carried by the ring and dial, a removable member having perforations for the reception of both studs and governing the extent of adjustment, and means for automatically disengaging the stud carried by the ring from contact with the removable member.

13. In a device of the class specified, a stationary ring having an annular series of designating-marks, a dial having a pointer movable into radial alinement with any one of such marks, a fixed stud carried by the dial, a movable stud carried by the ring, means for adjusting the dial, and a train-order disk having perforations for the reception of both studs and governing the extent of adjustment, and a door or cover for the dial and ring adapted to engage with and force the movable stud from contact with the train-order disk.

14. A train-signaling mechanism, comprising a fixed casing, a ring carried thereby and having an annular series of designating-marks, a zero-indicator carried by the ring, a spring-pressed stud adapted to an opening in the ring, a pin carried by said stud, a revoluble disk rotated within the ring and having a pointer, means for adjusting the disk to aline the pointer with any one of the designating-marks of the ring, a fixed stud carried by the dial, a train-order disk having perforations to engage the pin of the stationary ring and the stud of the dial thereby to govern the extent of adjustment of such dial, a door carried by the casing and having means for engaging the spring-pressed stud to force the latter to inoperative position, said door having a transparent panel through which the movement of the train-order may be observed.

15. In a device of the class specified, a train-order of disk-like form and bearing on its surface designating-data including the names of railroad-stations, said disk having two concentric rows of designating-marks through which perforations may be formed.

16. In a device of the class specified, a casing, a dial, a hand or pointer adapted to travel over the dial, a revoluble support for said hand or pointer, a gear-wheel, a ratchet-wheel and a cam forming part of such support, an adjusting-pinion intermeshing with the gear-wheel, means for imparting a step-by-step movement to the ratchet-wheel, and a train-controlling mechanism governed by said cam.

17. In a device of the class specified, a casing, a stationary spindle carried thereby, a dial, a pointer adapted to travel over the dial, a gear-wheel, a ratchet-wheel and a cam all carried by and revoluble on the spindle, an adjusting-pinion intermeshing with the gear-wheel, means for imparting a step-by-step movement to the ratchet-wheel, and a train-controlling mechanism governed by the cam.

18. In a device of the class specified, a casing, a stationary spindle therein, a cam mounted on said spindle, a train-controlling mechanism governed by said cam, a friction-drum carried by the cam, an adjustable band-brake for said drum, a ratchet-wheel and a gear-wheel secured to and revoluble with the cam and drum, a stationary dial, a pointer carried by the gear-wheel and adapted to travel over said dial, an adjusting-pinion intermeshing with the gear-wheel, and means for imparting a step-by-step movement to the ratchet-wheel.

19. In a device of the class specified, a stationary casing, a dial carried thereby, a hand or pointer adapted to travel over the dial, a revoluble support for the hand or pointer, a ratchet-wheel connected to such support, a pawl for engaging the ratchet-wheel, a pawl-guiding box in which the shank of the pawl is situated, a spring engaging the shank of the pawl and tending to force the latter into engagement with the ratchet-wheel, a revoluble disk carried by the shank of the pawl, and a pin carried by said disk and serving as a means for locking the pawl in disengaging position, substantially as specified.

20. In a device of the class specified, a casing, a train-controlling means, a cam for governing the same, a ratchet-wheel connected to the cam, a pawl in engagement with said ratchet-wheel, a cylinder, a piston located in the cylinder, a piston-rod connecting the piston and the pawl, and means for automatically admitting fluid under pressure to said cylinder.

21. In a device of the class specified, a casing, a train-controlling means, a cam for governing the same, a ratchet-wheel connected to the cam, a pawl in engagement with said ratchet-wheel, a cylinder, a piston situated in the cylinder and connected with the pawl, a spring for returning the piston to an initial position after each operative movement, and an automatically-operated valve controlling the admission of fluid under pressure to said cylinder.

22. In a device of the class specified, a train-controlling mechanism having as one of its elements a ratchet-wheel, a pawl in engagement with the ratchet-wheel, a cylinder, a piston situated in the cylinder and connected to the pawl, a valve-casing connected to the cylinder, a source of pressure-supply also connected to said valve-casing, a valve situated in the casing and controlling the flow of fluid under pressure to the cylinder, and means for automatically opening and closing said valve.

23. In a device of the class specified, a train-controlling mechanism having as one of its elements a ratchet-wheel, a pawl in engagement with the ratchet-wheel, a cylinder, a piston situated in the cylinder and connected with the pawl, a valve-casing connected to the cylinder, a source of pressure-supply also connected to the valve-casing, a valve controlling the flow of fluid under pressure to said cylinder, a valve-rod, a pivoted arm adapted to operate thereon, and a series of actuating devices provided along the line of the road for contact with said arm.

24. In a device of the class specified, a valve-casing having inlet and outlet ports, a valve controlling the flow of fluid between such ports, a valve-rod extending through the casing, a pivoted arm, a block or lug carried thereby, and an adjustable set-screw carried by the block or lug and adapted for contact with the valve-rod, means for limiting the downward movement of the arm, and a roller carried by the arm for contact with projections on the road-bed.

25. In a device of the class specified, an air-brake system having a train-pipe, a valved branch pipe connected to the pipe, a cam normally holding said valve in closed position, a ratchet-wheel connected to said cam, a pawl engaging the ratchet-wheel, and means for imparting a step-by-step movement to the cam through the pawl and ratchet-wheel.

26. In a device of the class specified, a pipe having a connection with the train-pipe of an air-brake system, a valve in said pipe, a valve-rod, a cam in contact with the valve-rod and normally serving to hold said valve-rod in an elevated position, a guiding-block for the valve-rod, a cushioned lug carried by the valve-rod and adapted for contact with said block, and means for rotating the cam to permit the opening movement of the valve.

In testimony that I claim the foregoing as my own I have hereto affixed my signature in the presence of two witnesses.

DANFORD W. JEWELL.

Witnesses:
JEANETTE BALL,
FRANK TOONDER.